(12) United States Patent
Peters et al.

(10) Patent No.: US 7,653,880 B2
(45) Date of Patent: Jan. 26, 2010

(54) APPLICATION OF DATA-BINDING MECHANISM TO PERFORM COMMAND BINDING

(75) Inventors: Ted Andrew Peters, Bellingham, WA (US); Kenneth Bruce Cooper, Seattle, WA (US); Lutz Röder, Seattle, WA (US); Samuel W. Bent, Bellevue, WA (US); Namita Gupta, Seattle, WA (US); David J. Jenni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/822,910

(22) Filed: Apr. 13, 2004

(65) Prior Publication Data

US 2005/0229190 A1    Oct. 13, 2005

(51) Int. Cl.
    *G06F 3/00* (2006.01)
(52) U.S. Cl. .................................................. 715/762
(58) Field of Classification Search ................. 719/331, 719/332; 709/320; 715/763, 762
    See application file for complete search history.

(56) References Cited

U.S. PATENT DOCUMENTS

| | | | | |
|---|---|---|---|---|
| 5,083,262 A | * | 1/1992 | Haff, Jr. ........................ | 703/27 |
| 5,255,356 A | | 10/1993 | Michelman et al. ......... | 395/148 |
| 5,388,196 A | | 2/1995 | Pajak et al. .................. | 395/153 |
| 5,396,587 A | | 3/1995 | Reed et al. ................... | 395/145 |
| 5,452,459 A | | 9/1995 | Frury et al. .................. | 395/700 |
| 5,485,617 A | | 1/1996 | Stutz et al. ................... | 395/700 |
| 5,581,760 A | | 12/1996 | Atkinson et al. ............. | 395/700 |
| 5,706,505 A | | 1/1998 | Fraley et al. ................. | 395/614 |
| 5,835,904 A | | 11/1998 | Vicik et al. ...................... | 707/1 |
| 6,167,455 A | * | 12/2000 | Friedman et al. ............. | 719/320 |
| 6,330,006 B1 | | 12/2001 | Goodisman .................. | 345/762 |
| 6,378,004 B1 | | 4/2002 | Galloway et al. ........... | 709/321 |
| 6,401,099 B1 | | 6/2002 | Koppolu et al. ............. | 707/106 |
| 6,429,882 B1 | * | 8/2002 | Abdelnur et al. ............ | 715/763 |
| 6,438,618 B1 | | 8/2002 | Lortz et al. .................. | 709/318 |
| 6,463,442 B1 | | 10/2002 | Bent et al. ................... | 707/103 |
| 6,571,253 B1 | | 5/2003 | Thompson et al. .......... | 707/103 |
| 6,826,759 B2 | * | 11/2004 | Calder et al. ................. | 719/328 |
| 2001/0042140 A1 | * | 11/2001 | Calder et al. ................. | 709/328 |
| 2002/0026447 A1 | * | 2/2002 | Matsutsuka et al. ...... | 707/103 Y |
| 2003/0035003 A1 | | 2/2003 | Marcos et al. .............. | 345/760 |

FOREIGN PATENT DOCUMENTS

WO        WO 97/15883        5/1997

OTHER PUBLICATIONS

Thimbleby, H., "View Binding and User Enhanceable Systems", *The Visual Computer*, 1994, 10(6), 337-349.

(Continued)

*Primary Examiner*—Stephen S. Hong
*Assistant Examiner*—Omar Abdul-Ali
(74) *Attorney, Agent, or Firm*—Woodcock Washburn LLP

(57) ABSTRACT

A data-binding engine is used to perform command binding. A data binding engine binds user interface controls such as buttons, menus, list boxes, etc. to commands exposed on an application model. A data source and data binding path may be specified in a markup language that defines how the commands are bound to UI elements.

34 Claims, 6 Drawing Sheets

OTHER PUBLICATIONS

Balena, F., "Introducing Visual Basic 6, Learn the Major New Features of VB6", *Visual Basic Programmers Journal*, 1998, 28-31, 34-40, 42,44,46-47.

Dobson, R., "Data Binding in Dynamic HTML", *DBMS*, Mar. 1998, 47-48, 50-52.

Dobson, R., Dynamic HTML Explained, Part III, *Byte*, 1998, 43-44.

Verstak, A., "BSML: A Binding Schema Markup Language for Data Interchange in Problem Solving Environments", *Scientific Programming*, 2003, 11, 199-224.

* cited by examiner

APPLICATION OF DATA-BINDING MECHANISM TO PERFORM COMMAND BINDING

CROSS-REFERENCE TO RELATED APPLICATIONS

The application is related to patent application Ser. No. 10/823,461 entitled "PRIORITY BINDING", filed herewith.

FIELD OF THE INVENTION

The invention relates to computer processing and in particular to using a data-binding mechanism for command binding.

BACKGROUND OF THE INVENTION

The code for application programs is frequently separated into a layer for user interaction (a set of "views" or user interfaces (UIs)) and a layer for implementing the internal application logic and data management (often realized through a set of "models"). The user interface typically includes menu items and other UI elements that invoke functionality implemented on the models.

Typically, a graphic designer designs the look of the user interface while a developer writes the code that implements the user interface and/or the underlying model. Graphic design and software development are two very different disciplines and it is frequently difficult for designers and developers to work together productively. Typically, a designer uses graphics tools such as Adobe® Photoshop® and Adobe® Illustrator® to create a mock up of a user interface (UI) and then a developer re-implements the UI in code. The original graphic design elements are typically not re-used in the final implementation and sometimes, parts of the design are lost in the process because the developer either cannot easily recreate the design in code or does not fully understand the design. If the design is modified, the designer may be required to redraw the UI and the developer may have to rewrite parts of the code to match the design. In short, the process is clumsy.

Another problem encountered when architecting such an application is how to expose functionality (commands) and how to map or bind that functionality to elements in the UI. For example, a text processing application may expose functionality for cutting selected text. This functionality may be exposed as a "command" (e.g., the document exposes a way to invoke a "cut" command). Program code is required to make the connection between what happens on the UI and what happens to the underlying data, that is, to define how the command binds to the menu item.

Traditionally, event handlers or command routing was employed to perform this task. Event handlers provide a direct way to bind code and UI elements. A UI element may expose an event declaration (e.g., "Click" on a menu item) and the model may implement a method (e.g., an event handler) that matches the signature of the event declaration. However, this mechanism is not very flexible. Changes in the active data model (e.g., the active document in the above example) or the command state (e.g., the "cut" command becomes inactive or disabled) typically requires additional code to be written by a developer to connect and disconnect event handlers and to update the state of the user interface.

Advanced applications that require flexibility in command handling typically assign an identifier (ID) for each command associated with a UI element. Such systems usually have a central service (sometimes called a command manager) that maps a command ID to the currently active implementation of the command. The command manager handles a set of active command targets (i.e., a set of models that expose commands). To execute a command, an identifier is sent from the UI to the command manager and the command manager finds the command target that is handling a command with the received ID and invokes the command on that target. Unfortunately, this mechanism is rather complex and difficult to master.

It would be helpful if there were an easy, flexible way to connect UI elements to the commands exposed on the application model. Moreover, it would be helpful if it were also possible to make the software development process easier for designers and developers.

SUMMARY OF THE INVENTION

A data-binding engine is used to perform command binding. A data binding engine binds user interface controls such as buttons, menus, list boxes, etc. to commands exposed on an application model. In some embodiments of the invention the command binding is specified declaratively in markup language. A data binding path and data source may be specified in the markup that defines how the commands are bound to UI elements.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Suppose a text processing application handles a number of document objects that expose functionality for cutting selected text. The application may provide a menu item labeled "Cut" on the "Edit" menu. The application needs to define how the "Cut" command binds to the menu item and to the active document. Traditional methods of command binding are complex and add to the difficulties inherent in designer/developer interaction. In accordance with some embodiments of the invention, command binding is accomplished by declaratively associating data binding command paths to elements or components of a user interface, sending change notifications when a command property changes and updating the target automatically by a object-binding mechanism, thereby decreasing the complexity level and the need for technical expertise in command binding and routing.

Exemplary Computing Environment

Figure 1:
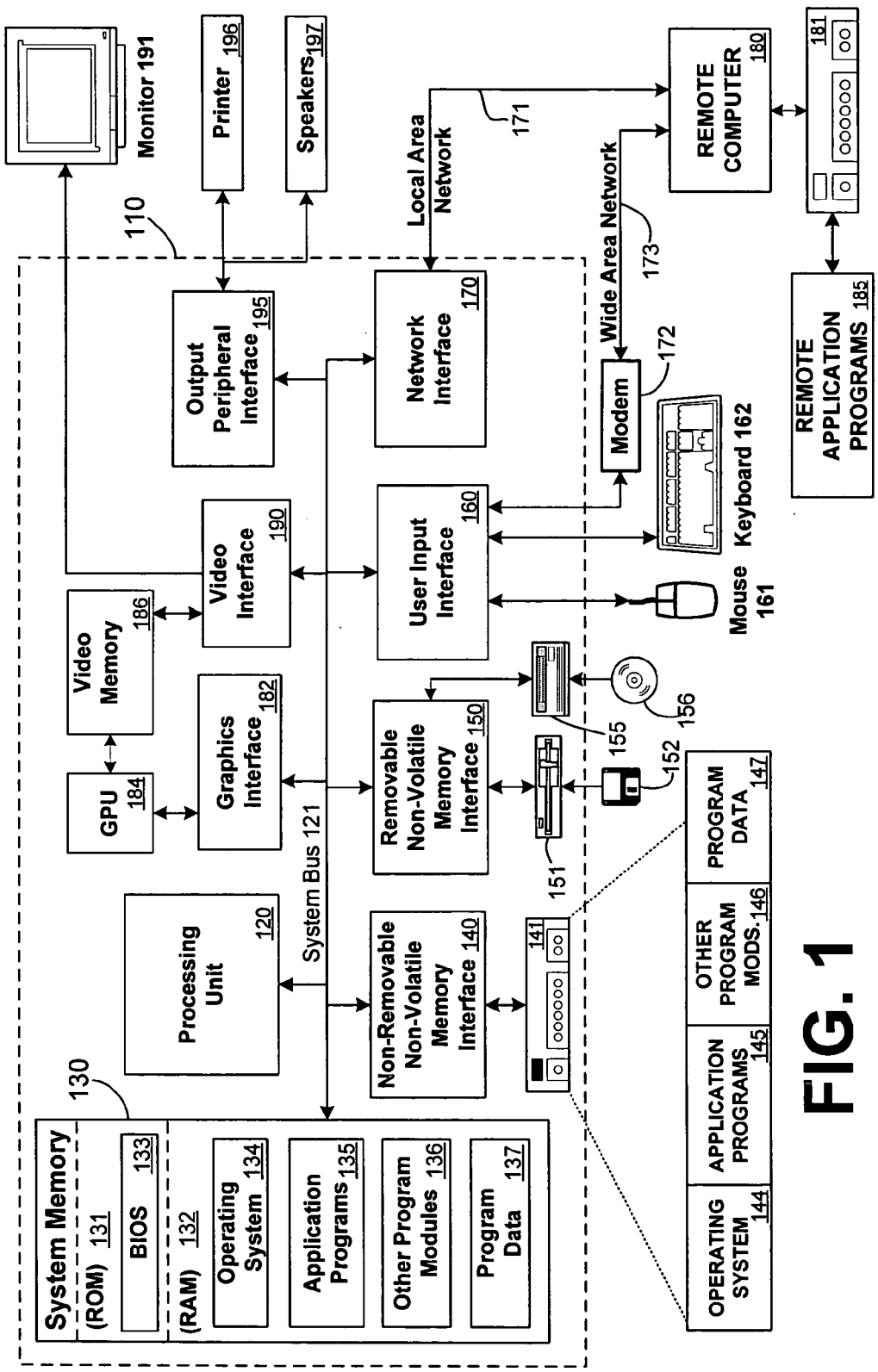
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1*a*. The logical connections depicted in FIG. 1*a* include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1*a* illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Using a Data-Binding Mechanism for Command Binding

Figure 2:
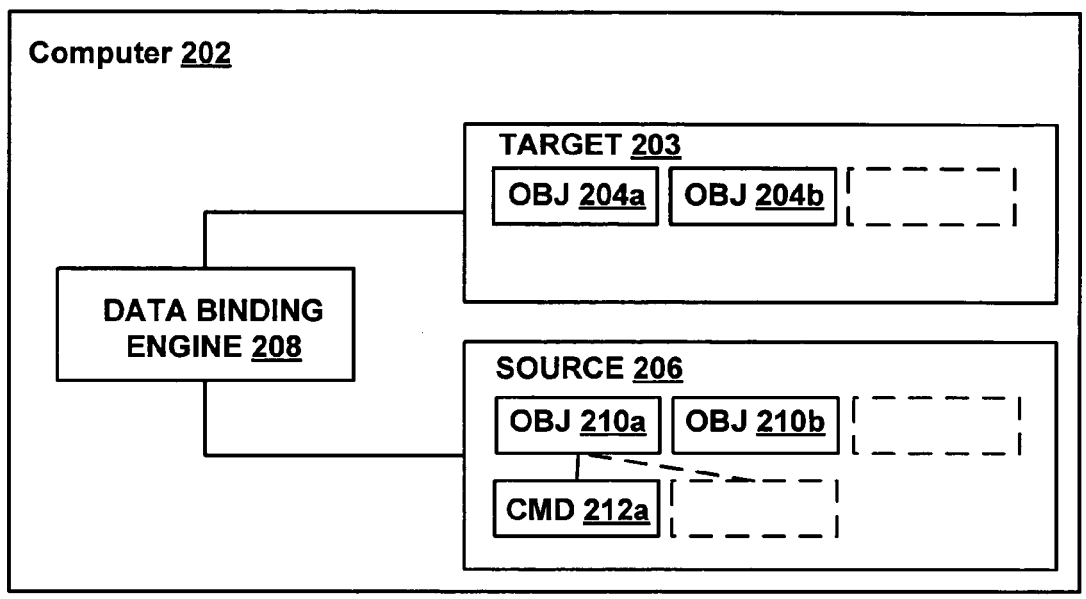
FIG. 2 is a block diagram of an exemplary system for command binding in accordance with one embodiment of the invention.

FIG. 2 illustrates an exemplary system for using a data-binding mechanism to perform command binding in accordance with some embodiments of the invention. Such a system may reside in whole or in part on one or more computers, such as exemplary computer 202 of FIG. 2. Computer 202 may comprise a computer such as computer 110 described with respect to FIG. 1. A system for using a data-binding engine to route commands may comprise one or more of the following elements: a data-binding component 208, a source 206, and a target 203.

In some embodiments of the invention, data-binding component 208 is a data binding engine 208, that enables the dynamic binding of a command object 212*a* of a source object, (e.g., exemplary source objects 210*a*, 210*b*, etc.) to a target object, (e.g., exemplary target objects 204*a*, 204*b*, etc.). The data binding engine may listen to property change notifications on objects so that a change to a source object command property is automatically reflected on the associated target object property. The data binding engine may listen to property change notifications on objects so that a change to a source object non-command property is automatically reflected on the associated target object property and vice versa. A target object may be associated with a data source, which identifies the source to which the target object is bound. The data binding engine may support the evaluation of property paths to enable the binding of specific parts of the target to specific parts of the source. In some embodiments of the invention, binding target object properties to source object command properties may be done declaratively in a markup language such as HTML (HyperText Markup Language), XML (eXtensible Markup Language), XAML (eXtensible Application Markup Language) or other suitable markup language. The data binding engine may search for the source object command property on the target object's data source and perform the appropriate updating.

Figure 6:
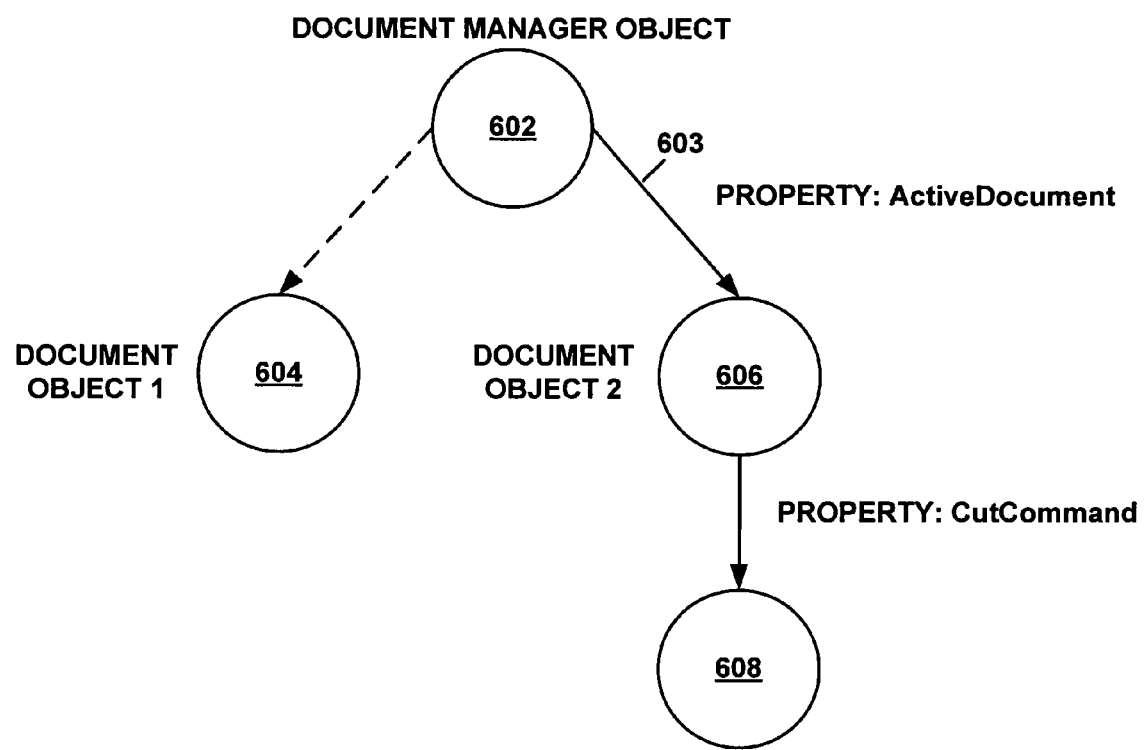
FIG. 6 is a block diagram of objects in accordance with an aspect of the invention.

In some embodiments of the invention, a graph of object-oriented objects is generated where one, some, or all objects point to other objects, forming a graph where each arrow pointing from one object to another in the graph represents a property. An exemplary graph of object-oriented objects is illustrated in FIG. 6. In FIG. 6, object 602 represents a document manager object, objects 604 and 606 represent document objects and object 608 represents a "cut" command. In FIG. 6, the active document is document object 606 (denoted by sold line 603 representing the ActiveDocument property). It will be understood that the invention as contemplated is not limited to such objects and commands. Any suitable objects and commands may be acted upon. Indeed, the invention as contemplated is not limited to objects in an object-oriented programming language environment but may be equally applied to any data source and hierarchy of properties. In some embodiments of the invention, the data binding engine 208 enables the specification of a data source (object 602) and a property path such as "ActiveDocument.CutCommand" representing the path from object 602 to object 606 to object 608. The data binding engine 208 can query into the object graph representing "live" objects within a running program, to dynamically determine which object is represented by the path "ActiveDocument.CutCommand" (in this case, object 608).

Referring again to FIG. 2, source 206 may include one or more source objects as represented by source objects 210a, 210b, etc. Source objects 210a, 210b, etc. may be associated with one or more source command objects, represented in FIG. 2 by source command object 212a, etc. In some embodiments of the invention, source 206 may represent a model. A model in some embodiments of the invention is the underlying application logic representing a collection of underlying state. For example, consider an application that enables a user to explore the file system. The model for the application in this case may be a file system: the set of folders and files within the folders of a selected directory. A number of views may be bound to one model. The views bound to the model may be dependent on the model. In some embodiments of the invention, however, the model is not dependent on the view or views. A model may send a change notification if a property on one of its objects changes or if a change in state occurs. For example, if a new file is added to a folder, a change notification may be sent.

Source objects 210a, 210b, etc. may be associated with one or more command objects as represented by source command objects 212a, etc. In some embodiments of the invention, a command object is an object that is associated with an execution method, (that is, a command object is an executable object) and has state. The state associated with the command object in some embodiments of the invention is a Boolean value representing whether or not the command can be executed, that is, whether or not the command is active (enabled) or inactive (not enabled). Examples of commands include but are not limited to "open a document", "cut selected text" and so on Target 203 may include one or more target objects as represented in FIG. 2 by target objects 204a, 204b, etc. In some embodiments of the invention, the target may be a view or user interface. One or more views may be bound to a model and display the state of the underlying model. In some embodiments of the invention, a view or user interface is defined in a markup language such as HTML (HyperText Markup Language), XML (eXtensible Markup Language), XAML (eXtensible Application Markup Language) or other suitable markup language, in which the look of the user interface is defined and the elements or components of the user interface are defined. A target object may be a user interface element or control such as but not limited to a menu item, button or list box. In the file system example described above, an exemplary user interface may display the list of current files in the folders of the selected directory.

To bind the user interface to the underlying model, in some embodiments of the invention, instead of explicitly defining the binding using an event handler or indirectly associating the user interface component to the underlying model via assigning an ID and invoking a command manager, the object representing the user interface component is bound to the underlying model object by specifying a data source object and a query path, as described above with respect to FIG. 6. If any part of the query changes, a change notification is sent by the object, and the data binding engine detects the change notification and updates the appropriate object(s). It will be appreciated that the subject that is being queried are live objects within a running program.

Figure 3:
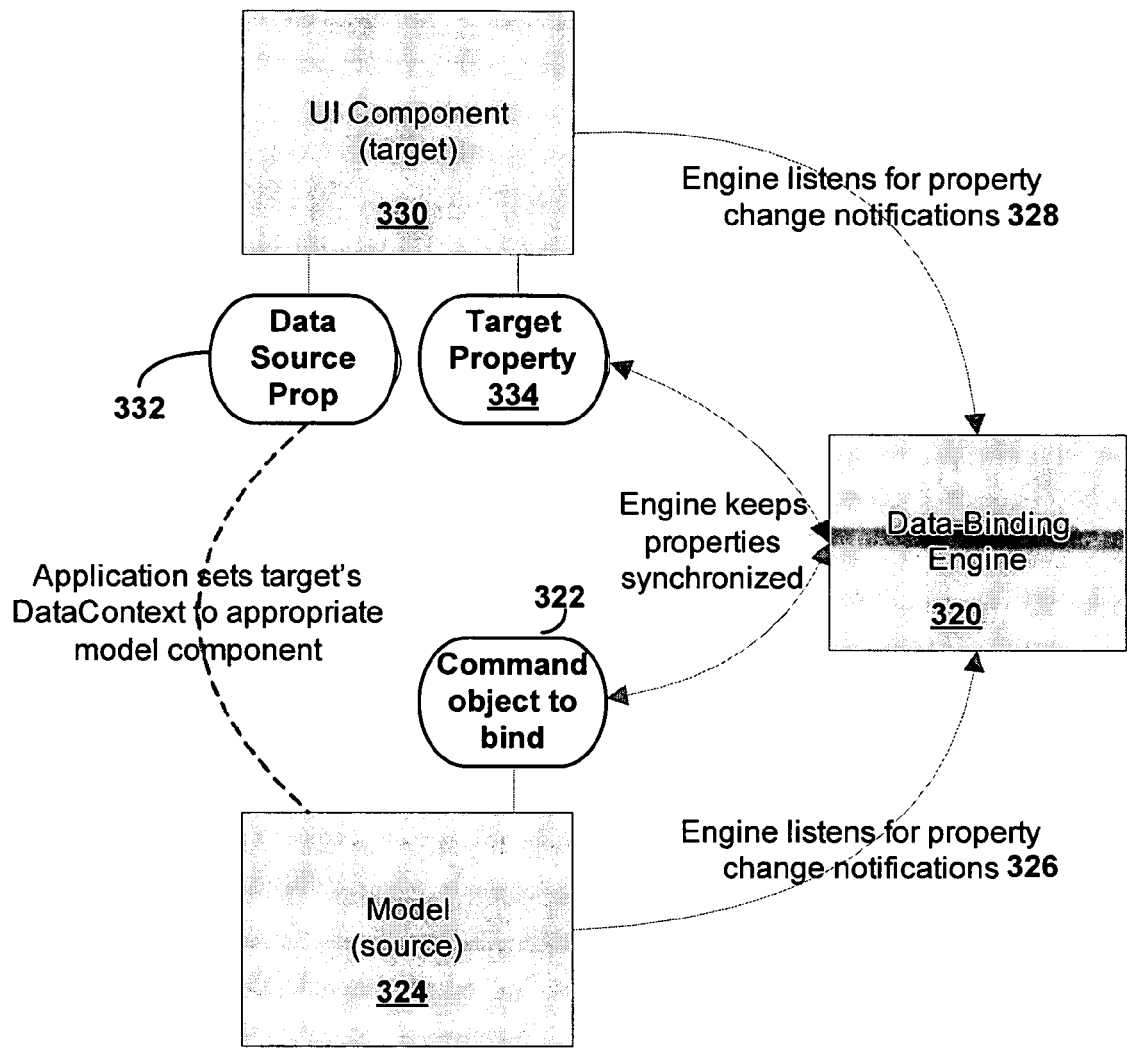
FIG. 3 is a more detailed block diagram of FIG. 2 in accordance with one embodiment of the invention.

FIG. 3 is a more detailed block diagram of the system of FIG. 2. In FIG. 3. the data binding engine 320 may bind a command property 322 on a source object (part of a model 324) to a property on a target object (e.g., a UI component 330). The data binding engine 320 may listen to property change notifications (notification 326 for model property 322, notification 328 for UI property 334) and synchronize the source 324 and target 330 automatically. A target 330 (e.g., a UI component) may be associated with a data source 332 which acts as the source to which the target 330 is bound.

In some embodiments of the invention, the UI property to bind 334 is a sink or target property for a command object and the model property to bind 322 is a command property on the model. An exemplary non-limiting target property may be, for example, "ClickCommand". In some embodiments of the invention, command binding is achieved by assigning the model 324 as a data source and data binding the property on the UI component 334 to the command property on the model 322. The binding may be achieved declaratively in some embodiments, without requiring any program code. An exemplary declarative statement may be:

<MenuItem ClickCommand="*Bind(DataSource=model, Path=DocumentManager.ActiveDocument.Cut Command)"/>

This statement means that the data source associated with the menu item "ClickCommand" is the object "model" and the object to be associated with the ClickCommand is the Cut Command property on the Active Document. The UI may be authored within a UI designer tool in markup without writing code, or outside of a designer tool in markup. Alternatively, the same result may be accomplished by writing program code.

In some embodiments of the invention, the command object may be associated with additional state exposed as properties. Examples include but are not limited to IsEnabled, textual name to be represented to the user, key binding or icon. State can either be provided explicitly by the developer or be computed or derived from other properties of the application. In some embodiments of the invention, the target object knows how to handle these properties (e.g. a menu item sets its enabled state to the IsEnabled property of the command object and updates its visual appearance, a menu item updates the text represented to the user to the Text property on the command object). The command object provides change notifications for those properties. The target object listens to change notifications and updates its properties and appearance in case of a change notification. Not all properties on the command object need to be known to the target object.

In some embodiment of the invention the target object doesn't implicitly handle some state properties. In this case data-binding is used to bind a known property on the command object to a known property on the target object:

<MenuItem Text="*Bind (Path=DocumentManager.ActiveDocument.Cut Command.Text"/>.

In some embodiment of the invention the command object is stateless and provides no properties at all. State properties can still be provided by the model and bound to the target elements using data-binding.

In some embodiment of the invention stateless commands can be realized by providing a method on the model and binding to that method (instead of a command object).

<MenuItem Click="*Bind(Path=ActiveDocument.Copy)" Enabled="*Bind(Path=ActiveDocument.CanCopy"/>

In this case no command object is needed. The CanCopy state is provided by the model and the Copy( ) method is bound using data-binding.

Figure 4:
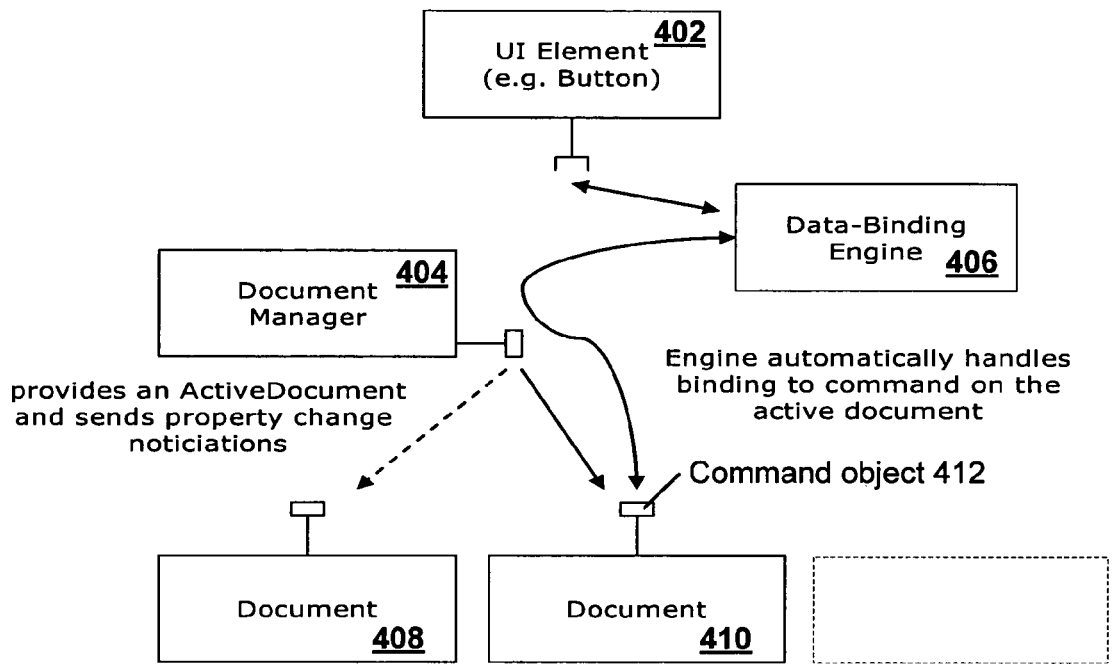
FIG. 4 is a block diagram of an exemplary use of the command binding system of FIG. 3 in accordance with one embodiment of the invention.

FIG. 4 illustrates a typical scenario in which a system for command binding according to some embodiments of the invention may be employed. Consider an application that handles multiple documents 408, 410, etc., one of which is active (i.e, document 410). A document manager 404 (part of the model) may expose a property for the active document. The document objects 408, 410, etc., (part of the model) may expose editing commands as properties, (e.g., command object 412) which may be selected. A declarative binding may be achieved in some embodiments using a property path first addressing the active document 410 and then selecting an editing command on the active document via a button on a user interface 402. Exemplary declarative binding statements may be:

<MenuItem ClickCommand="*Bind(Path=DocumentManager.ActiveDocument.CutCommand)"/> or:
<MenuItem ClickCommand="*Bind(Path=DocumentManager.ActiveDocument.CopyCommand)"/> or:
<MenuItem ClickCommand="*Bind(Path=DocumentManager.ActiveDocument.PasteCommand)"/>

In some embodiments the document manager 404 may provide a change notification for any change to the active document 410 property (e.g., user changes the active document). The change notification is detected by the data binding engine 406 and the command is rebound to the active document. It will be noted that in some embodiments of the invention, the above result was accomplished declaratively without authoring program code. No service for command management is required.

In some embodiments of the invention, arbitrary properties which are not command properties may be bound to menu items. For example, a Boolean property on a model may be bound to a check box menu item. In some embodiments of the invention, a check box UI component may expose a property such as "IsChecked" that can be used as a target property. Similarly, lists of object can be bound to a special list box menu item to address a scenario such as but not limited to a "most recently used" files list.

Figure 5:
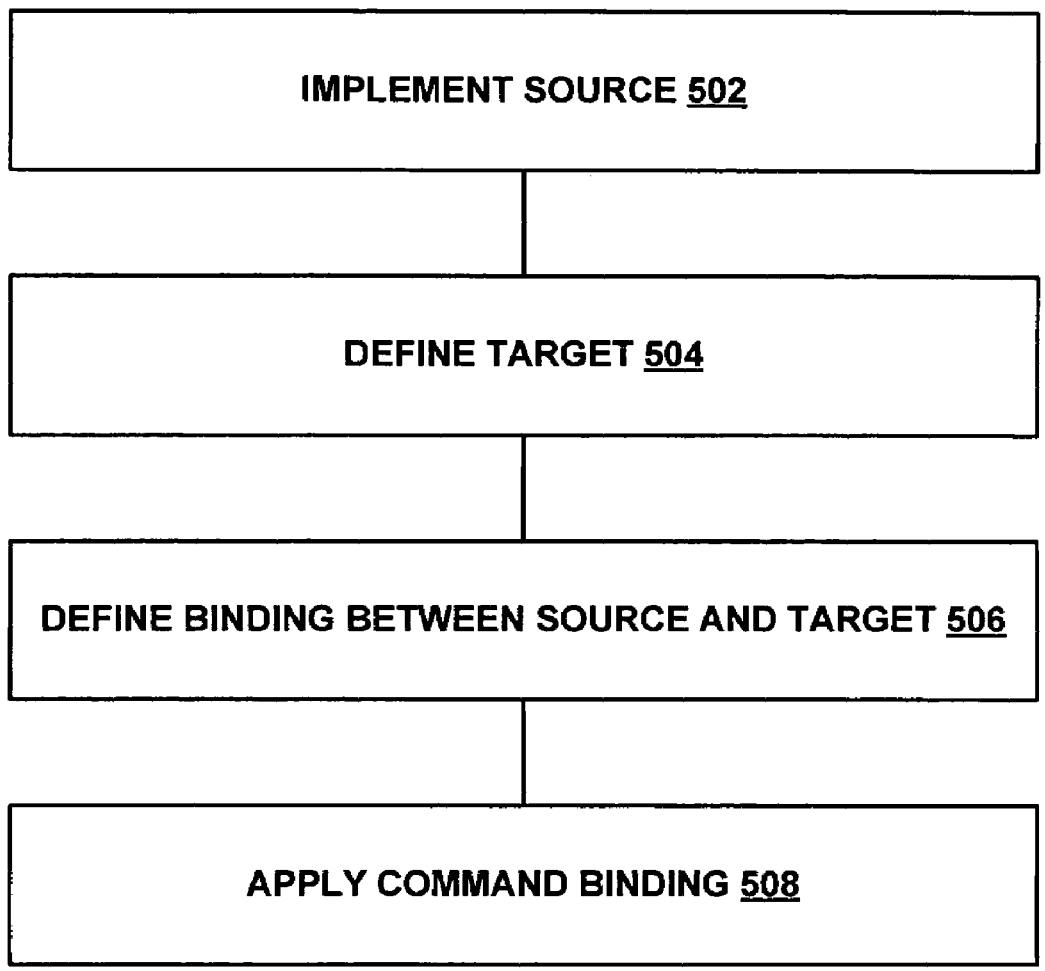
FIG. 5 is a flow diagram of an exemplary method of command binding in accordance with one embodiment of the invention.

FIG. 5 illustrates an exemplary flow diagram for a method of specifying and executing command bindings in accordance with one embodiment of the invention. One or more steps of the method may be optional. In FIG. 5, at step 502 a source definition is received. This may involve the coding and/or instantiation of a model or application. For example, a developer may implement the model, exposing one or more properties to be bound to. At step 504, a target definition is received. This may involve the specification in code or markup of a target such as a user interface and/or the instantiation of the user interface. For example, a designer may create a user interface in a markup language or a developer may create a user interface in code. At step 506 a command binding statement may be received. This may involve the coding of data connections between target and source (e.g., by a developer) or the specification of a command binding statements in markup (e.g., by a designer) as described above. In some embodiments of the invention, the specification of the command binding statement may be incorporated into definition of the target (step 504).

At step 508, the application comprising the model and the user interface may be generated and/or instantiated. A binding engine may listen on the paths of the model and evaluate the command binding statement. If the command binding statement evaluates successfully, the target and model may be synchronized as described above. In some embodiments of the invention, one or more command binding statements may be provided. The command binding may be accomplished by declaratively assigning one or more data binding command paths and data sources to a source as described above. In some embodiments of the invention, the command path and data source is declaratively defined in a markup language such as HTML, XML, XAML or another suitable markup language. The paths of the model may be continuously monitored for change notifications. A change notification may be received from a command object indicating that a command property has changed. In some embodiments of the invention, the change notification is sent by the command object and is detected by a data binding engine. If a change notification is received, the command binding statement may be re-evaluated and the source and target synchronized as described above. In some embodiments, the data binding engine queries into the object graph to find the object indicated by the data source and data path and the data binding engine updates the target automatically by a generic object-binding mechanism.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for binding commands between a source and a target comprising:
   at least one computing device comprising a data binding engine that:
      receives at least one binding statement mapping a command to an element of the target;
      binds an object representing the target to an underlying model object of an underlying application logic representing a collection of underlying state by a source object and a query path;
      evaluates the at least one binding statement; and
      updates the target to a value associated with the command; and
   stateless commands that are realized by providing a model method on a model and binding to the model method instead of a command object.

2. The system of claim 1, wherein the command is a command object.

3. The system of claim 1, wherein the command is associated with state.

4. The system of claim 3, wherein the command state is derived from the source.

5. The system of claim 3, where the command state is associated with an ability to be executed.

6. The system of claim 3, where the command state is associated with an inability to be executed.

7. The system of claim 1, wherein the command is a method.

8. The system of claim 1, wherein the at least one binding statement comprises a statement in a declarative markup language.

9. The system of claim 8, wherein the declarative markup language comprises HTML, XML or XAML.

10. The system of claim 1, wherein the at least one binding statement comprises an indication of a data source.

11. The system of claim 1, wherein the at least one binding statement comprises a binding path.

12. The system of claim 1, wherein the data binding engine queries into a graph of objects, comprising at least a first object and a second object wherein the first object points to the second object.

13. The system of claim 12, wherein the second object is a command object.

14. The system of claim 1, wherein the command comprises an object associated with an executable method and a Boolean state associated with an ability or inability of an execution method associated with the command object to be executed.

15. The system of claim 1, wherein the target is a user interface.

16. The system of claim 1, wherein the source comprises a collection of state of an underlying application.

17. A method of mapping a command to a target comprising:
   receiving at least one binding statement that defines a mapping between the command and the target and maps the command to an element of the target;
   binding an object representing the target to an underlying model object of an underlying application logic representing a collection of underlying state by a source object and a query path;
   determining a value of the command;
   updating the target to the value of the command; and
   realizing stateless commands by providing a model method on a model and binding to the model method instead of a command object.

18. The method of claim 17, wherein in response to determining that the at least one binding statement fails to evaluate, the value of the command is set to null.

19. The method of claim 17, wherein in response to determining that the at least one binding statement fails to evaluate, the value of the command is set to a default value.

20. The method of claim 17, wherein in response to determining that the value of the command is null, the target is disabled.

21. The method of claim 17, wherein the command is an object associated with state.

22. The method of claim 21, wherein the command state is derived from a data source.

23. The method of claim 21, wherein the command state is associated with an ability to be executed.

24. The method of claim 17, wherein the command is a method.

25. The method of claim 17, farther comprising monitoring a collection of objects comprising a data source for a change notification.

26. The method of claim 25, farther comprising in response to detecting the change notification, querying into a graph of objects of the data source to determine an updated value of the command.

27. The method of claim 26, farther comprising updating the target mapped to the command to the updated value of the command.

28. The method of claim 17, wherein the at least one binding statement comprises a declarative statement in a markup language.

29. The method of claim 28, wherein the markup language is HTML.

30. The method of claim 28, wherein the markup language is XML.

31. The method of claim 28, wherein the markup language is XAML.

32. The method of claim 17, wherein the target is an element of a user interface.

33. A computer-readable storage medium comprising computer-executable instructions for:
   receiving at least one binding statement that defines a mapping between a command of a data source and an element of a user interface;
   binding an object representing a target to an underlying model object of an underlying application logic representing a collection of underlying state by a source object and a query path;
   determining a value for the command;
   updating the element of the user interface to the value of the command;
   realizing stateless commands by providing a model method on a model and binding to the model method instead of a command object;
   monitoring a collection of objects comprising the data source for a change notification;
   detecting the change notification; and
   querying into a graph of objects of the data source to determine an updated value of the command.

34. The computer-readable storage medium of claim 33, comprising further computer-executable instructions for updating the user interface element associated with the command to the updated value of the command.

* * * * *

UNITED STATES PATENT AND TRADEMARK OFFICE
CERTIFICATE OF CORRECTION

| | | |
|---|---|---|
| PATENT NO. | : 7,653,880 B2 | Page 1 of 1 |
| APPLICATION NO. | : 10/822910 | |
| DATED | : January 26, 2010 | |
| INVENTOR(S) | : Ted Andrew Peters et al. | |

It is certified that error appears in the above-identified patent and that said Letters Patent is hereby corrected as shown below:

In column 12, line 19, in Claim 25, delete "farther" and insert -- further --, therefor.

In column 12, line 22, in Claim 26, delete "farther" and insert -- further --, therefor.

In column 12, line 26, in Claim 27, delete "farther" and insert -- further --, therefor.

Signed and Sealed this
Eighth Day of February, 2011

David J. Kappos
*Director of the United States Patent and Trademark Office*